Figure 1:
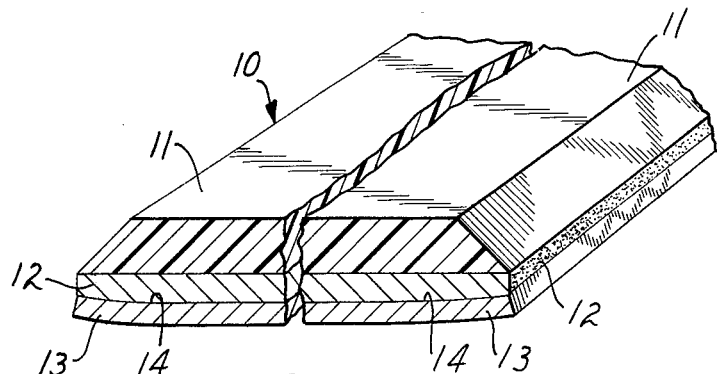

United States Patent [19]
Tungseth et al.

[11] 4,001,167
[45] Jan. 4, 1977

[54] ADHESIVE COMPOSITIONS COMPRISING AROMATIC PROCESS OIL AND BLOCK COPOLYMER

[75] Inventors: Barry F. Tungseth, St. Paul; James A. Lindlof, White Bear Lake, both of Minn.

[73] Assignee: Minnesota Mining and Manufacturing Company, St. Paul, Minn.

[22] Filed: Aug. 22, 1969

[21] Appl. No.: 852,256

[52] U.S. Cl. .................. 260/33.6 AQ; 260/27 BB; 428/40
[51] Int. Cl.$^2$ .......................... C08K 5/01
[58] Field of Search ... 260/33.6, 33.6 AO, 33.6 PO, 260/876, 879 R, 880 B

[56] References Cited

UNITED STATES PATENTS

| | | | |
|---|---|---|---|
| 3,132,027 | 5/1964 | Norton et al. | 99/169 |
| 3,220,966 | 11/1965 | Flanagan | 260/27 |
| 3,235,522 | 2/1966 | Carr | 260/33.6 AO |
| 3,239,478 | 3/1966 | Harlan | 260/27 |
| 3,265,765 | 8/1966 | Holden et al. | 260/880 B |
| 3,325,430 | 6/1967 | Grasley | 260/880 B |
| 3,500,603 | 3/1970 | Strack | 52/397 |
| 3,562,193 | 2/1971 | Leeks et al. | 260/33.6 AQ |

OTHER PUBLICATIONS

Modern Plastics Encyclopedia for 1968, Sept. 1967, vol. 45, No. 1A., pp. 474 & 475.
Zimmerman et al. *Handbook of Material Trade Names* p. 511 (Industrial Research Service, Dover N.H. 1953).
*Materials* ɟ *Compounding Ingredients for Rubber*, p. 236 (Rubber World, 1968).
Weinstock et al., *Industrial and Engineering Chemistry*, 45, No. 5, pp. 1035–1043 (May, 1953).

*Primary Examiner*—Paul R. Michl
*Attorney, Agent, or Firm*—Alexander, Sell, Steldt and DeLaHunt

[57] ABSTRACT

Adhesive compositions useful on sealing-strips for highways and for other purposes comprise high boiling viscous aromatic process oils fortified with minor amounts of styrene-diene block copolymer.

9 Claims, 2 Drawing Figures

INVENTORS
BARRY F. TUNGSETH
JAMES A. LINDLOF
BY Kinney, Alexander,
Sell, Steldt & DeLaHunt

ADHESIVE COMPOSITIONS COMPRISING AROMATIC PROCESS OIL AND BLOCK COPOLYMER

This invention relates to adhesives, and in particular to normally tacky self-healing soft adhesive compositions useful in adhering protective coverings to substrates. In one important aspect the invention relates to the sealing of cracks or contraction joints in concrete structures. In one particular aspect the invention relates to the sealing of highway contraction joints with semi-rigid flat strip coverings permanently held in place at the plane of the highway surface by a tacky, self-sealing and shock-resistant adhesive as will be more specifically described and illustrated.

Rubberized asphalt has long been recommended as a surfacing and crack-sealing composition for highway maintenance and repair. Small amounts, for example of the order of 3 to 15 percent, of natural or synthetic rubber dissolved in hot asphalt serve to improve the ductility and strength of the latter; but the mixture still undergoes plastic flow at high temperatures, contracts and becomes brittle at low temperatures, and has not proven fully effective as a sealant for highway contraction joints.

Styrene-isoprene and styrene-butadiene block copolymers have been described, e.g. in U.S. Pat. No. 3,265,765. Compositions containing such polymers in conjunction with varying amounts of oils and resins have been shown, in U.S. Pat. No. 3,239,478, to have pressure-sensitive adhesive properties.

It has now been found that highly aromatic, high-boiling, viscous oils, when modified by the incorporation of restricted amounts of certain block copolymers of non-elastic vinyl arene and elastic conjugated diene polymers, together with small amounts of other modifiers as desired, provide adhesive compositions having self-sealing properties as well as excellent adhesion to concrete, wood, metal, glass, plastics and other structural materials, and which are particularly useful in highway construction and maintenance. Unlike the adhesive compositions employed in pressure-sensitive adhesive tapes, these adhesives are more adhesive than cohesive.

The aromatic oils found useful in the practice of the invention are high-boiling viscous materials having an initial boiling point of at least about 700° F. and an SSU viscosity at 210° F. of at least about 250. Analysis by the clay-gel method indicates an aromatic content of at least about 55%. Many of the "Dutrex" aromatic hydrocarbon process oils of Shell Chemical Company fall within such classification.

Useful as modifiers of the aromatic oils are block copolymers having the type formula A-B-A, wherein each A is a non-elastomeric polymer block of a vinyl arene and having an average molecular weight of about 5,000 to about 125,000 or even higher, and B is a polymer block of a conjugated diene and having an average molecular weight of about 75,000 to about 250,000. The total A component is between about 10 and about 40 percent, with preferred examples being between about 15 and about 30 percent of polystyrene A blocks and the balance being polyisoprene or polybutadiene B blocks. Certain of the Shell "Kraton" block copolymers are typical examples of such materials. The amount of such copolymer is between about 25 to 50, preferably 35 to 45 parts per 100 parts of the process oil.

The styrene-diene block copolymers are soluble in the aromatic process oils and may be dissolved therein by prolonged heating and mixing, but with degradation of the polymer. Some means of protecting the latter component is therefore required. The hindered phenol antioxidants are useful for this purpose, and they offer continued protection of the composition during subsequent exposure. Amounts of approximately 1 percent by weight on the weight of the polymer are ordinarily adequate, but greater or lesser amounts may be used. Further protection during mixing and compounding may be achieved by accomplishing these operations under an inert atmosphere of nitrogen or carbon dioxide.

The tendency of the aromatic process oils to crystallize at low temperatures and to cause embrittlement or loss of shock resistance in the adhesive mass may be reduced by selection of the lower viscosity oils or by addition of minor proportions of non-crystallizing paraffinic oils or polymers. The amount of such additives must be small in order to avoid excessive softening and flow of the adhesive at high use temperatures, a tendency which results also when using the lower molecular weight or low styrene content block copolymers.

The addition of small amounts of compatible low molecular weight polyolefin polymers, e.g. polyethylene, serves also as a means of overcoming softening and plastic flow in these compositions, but has a tendency to reduce the adhesion and elongation values. The proportion of such polyolefin additive is therefore to be restricted to not greater than 30 parts, or preferably 25 parts, per 100 parts of the copolymer.

The aromatic process oils are ordinarily adequately tacky and provide good adhesion to most surfaces. Where additional tackiness is required it may be achieved by the incorporation of small amounts of compatible tackifier resins such for example as polyterpene resin or other non-crystallizing resinous tackifiers, of which a number are included in the list of tackifying resins given in U.S. Pat. No. 3,239,478.

Figure 2:
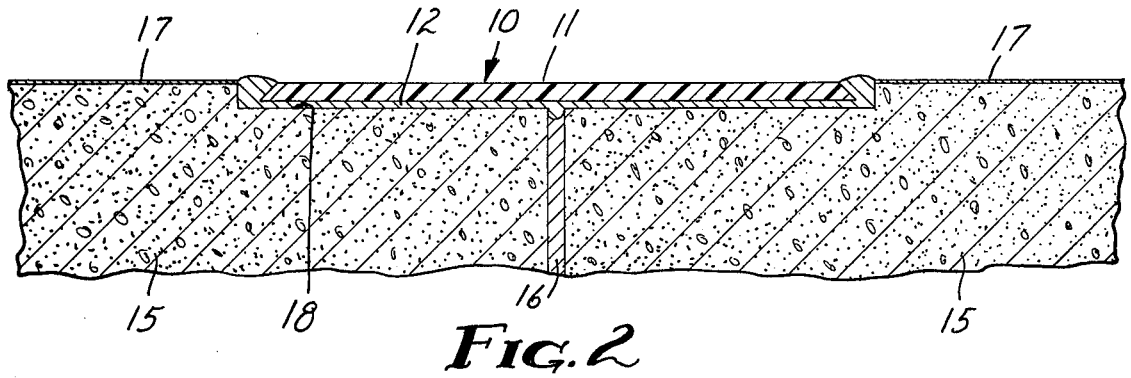

In the drawing,

FIG. 1 is a view in perspective of a highway joint cover-strip product including a coating of the adhesive composition of this invention, and FIG. 2 is a partial cross-sectional elevation of a highway contraction joint area including the cover-strip of FIG. 1.

The cover-strip 10 consists essentially of a semi-rigid thin plastic or metal strip 11 having chamfered longitudinal edges and coated over one surface with a coterminous uniform layer of adhesive 12. A removable liner or cover-strip 13 having a surface release coating 14 covers the adhesive surface during storage and shipping.

FIG. 2 illustrates abutting sections 15 of a concrete highway separated by a narrow crack-like opening which may or may not have been filled with an asphalt-based filler 16. The upper surface of the highway carries a thin water-resistant layer 17 which is ground away, together with a thin layer of the concrete, to form a shallow trench 18. The cover-strip 10, with liner 13 removed, is laid along this trench and is pressed into place. The adhesive layer is thereby brought into full adhesive contact with the surfaces defining the trench and with the edges of the coated strip.

In warm weather the adhesive is sufficiently firm to resist further flow under heavy traffic, and the vinyl strip protects the adhesive from excessive localized pressures and from pickup of loose pebbles or sand. The assembly is also fully waterproof and permits no entry of water through the crack-like opening. In cold weather the concrete slabs contract, increasing the width of the opening and pulling away from the filler 16. Plastic flow of the adhesive is sufficient to avoid breakage or loss of the protective vinyl strip. In extremely cold weather the adhesive may fail temporarily at isolated areas by internal splitting or separation; but its self-sealing properties are such that subsequent traffic recoheres the surfaces and renews the bond. During the next period of warmer temperatures the slabs again expand. The protective cover is maintained throughout repeated cycles.

The adhesive may be spread directly on the surface of the vinyl strip or on any other desired substrate either at an elevated temperature or suspended or dissolved in a volatile vehicle. A preferred procedure involves coating the adhesive on a removable carrier sheet, e.g. by hot spreading using a heated spreader bar and base plate, and then transferring the adhesive layer to any desired surface and removing the carrier.

The following specific Examples, in which all proportions are in parts by weight unless otherwise noted, will further illustrate the invention.

Example 1

Seventy parts of aromatic hydrocarbon process oil boiling above 700° F., having an SSU viscosity at 210° F. of 478 and analyzing 57.6 percent aromatics by the clay-gel method ("Dutrex No. 957" oil) is heated to 270° C. Under an inert atmosphere and with continued agitation there is first added 0.3 part of liquid hindered phenol antioxidant ("Wingstay T") followed by 30 parts of an A-B-A type styrene-isoprene block copolymer containing 28% polystyrene ("Kraton 1108"). Solution of the copolymer in the hot oil is accomplished in about three hours of mixing at the elevated temperature. There is then added six parts of high melting polyterpene resin tackifier ("Piccolyte S-115"), followed by five parts of powdered polyethylene resin having a melt index of 22 ("Microthene MN 725-20") and one part of carbon black.

The well-mixed plastic composition is smoothly spread over the surface of a silicone-treated paper liner using a knife coater and at a temperature of about 250° F., which is sufficient to maintain a spreadable consistency. After cooling, the coating has a thickness of approximately 0.06 inch.

While the coating is still at a relatively high temperature, or after reheating the cooled material to about 150° F., the coated web is pressed against flat strips of rigid pigmented unplasticized extruded vinyl chloride resin having cross-sectional dimensions of 0.096 × 3.0 inch. The coating adheres firmly to the strips and after cooling the treated paper liner may be stripped away, leaving a smooth glossy tacky surface. With the liner in place the product may be wound up in coils on cores or drums having a diameter not less than about 1 foot, this being an indication of the semi-rigid character of the plastic carrier.

A section of concrete highway containing a contraction joint area is first prepared by grinding away the surface to a width of 3⅛ inch and depth of 0.15 inch along the joint area. The area is blown free of loose dust, leaving a clean flat freshly exposed concrete surface extending equally from both sides of the joint, which in this instance contains residual asphalt filler material. The strips of coated vinyl resin are laid end-to-end along the groove and are pressed in place by rolling with a 3 inch diameter, 3 inch width smooth-surfaced steel roller weighted to a total of 300 lbs. The adhesive composition adheres firmly to the concrete. It flows beyond the edges of the vinyl strip to fill the edge voids between the strip and the edges of the groove, leaving the upper surface of the strip in the plane of the highway surface. The highway is immediately opened to traffic. The seal is highly resistant to traffic and maintains a waterproof joint under prolonged service under both summer and winter conditions as experienced in the northern states.

The adhesive composition is further tested for adhesion value, tensile strength, elongation, brittleness and resistance to viscous flow, with results as follows:

| | |
|---|---|
| Adhesion | 20 gm./sq.cm. |
| Tensile | 160 psi |
| Elongation | 1500 % |
| Brittle Point | 5° F. |
| Slump | none (10 min. at 160° F.) |

The adhesion value is obtained at room temperature by carefully placing the smooth flat end of a steel rod against the surface of the adhesive coating under defined conditions and measuring the force required to lift the rod from the adhesive mass, a portion of which is found to remain adhered to the rod. The rod is 1/16 inch in diameter, is applied at a weight of 2 grams, and is removed slowly after a dwell time of 1 second. An adhesive coating thickness of 0.02 inch is employed in critical determinations. An adhesion value of at least about 10 gm./sq.cm. is required for effective use as a highway sealant.

Tensile and elongation at room temperature (about 72° F.) are determined at break, using a narrow flat strip of the adhesive produced by spreading on a release liner to a thickness of approximately ⅛ inch, removing the coating by careful hand manipulation after first cooling if necessary, powdering the surface to permit cutting, and cutting to a dumb-bell shape having a central section of ⅛ inch width, for testing on an Instron tensile test machine using an initial marked length of ½ inch and a machine speed of 12 in./minute. Results are calculated to the initial effective dimensions of the strip. Tensile strength must be at least about 4 psi if excessive flow under pressure is to be avoided. Elongation of at least about 50% is required if brittleness is to be avoided.

Brittleness is also determined on a narrow unsupported strip of the composition, by determining the temperature at which a sudden change occurs in the ability of the strip to overcome twisting. As defined for the Gehman test, similar to ASTM test procedure D 1053, the specimen is 0.1 × 0.125 × 1.5 inches in dimensions. It is clamped between jaws spaced 1 inch apart and is brought to constant temperature. The upper jaw is supported on a torsion wire from a rotatable support which is rotated 180° to rotate a pointer attached to the jaw through an arc of between 120° and 170°. The pointer slowly returns toward its former position and its position at ten seconds is determined as the Gehman value. The test is repeated over an appropriate range of temperatures, and a graph of temperature vs. Gehman value is drawn. The point of intersection of the two straight portions of the graph is taken as the brittle point, which for highway sealant purposes in northern latitudes should be not higher than about 20° F. or preferably not higher than about −20° F., where very low temperatures are to be encountered.

For the slump test, a narrow strip of the adhesive composition is pressed against a flat wooden surface and supported at an angle of 60° to the horizontal in an oven under specified time and temperature conditions, and the extent of flow along the panel between the initial and final positions of the lower edge is determined to the nearest 1/64 inch. The strip is ⅛ inch thick and ½ inch wide and heating is continued for 10 minutes at 140° F. unless otherwise indicated. Compositions intended for use in highway sealing should show no more than a trace of movement under these conditions, and will ordinarily be equally free of slumping tendencies in 15 minutes at 160° F.

Example 2

Seventy parts of process oil having an SSU viscosity at 210° F. of 516, an initial boiling point of 740° F., and an aromatics content of 61.8 weight percent by the clay-gel method ("Dutrex 959") is heated to 240° F. To the hot oil is added 0.25 part of antioxidant, 25 parts of styrene-isoprene block copolymer containing 14% styrene ("Kraton 1107"), 5 parts of rubbery polyisobutylene ("Vistanex"), and 3 parts of low mol. wt. polyethylene ("Microthene 702"), each polymer in turn being completely dissolved before the next addition. The composition exhibits the following properties:

| Adhesion | 10 gm./sq.cm. |
|---|---|
| Tensile | 5 psi |
| Elongation | 1900 % |
| Brittle Point | −30° F. |
| Slump | none |

It is applied to silicone-treated paper liner and transferred to strips of rigid vinyl resin which are then applied over a 1 inch width partially asphalt-filled contraction joint in a concrete highway, all as described under Example 1. The seal affords complete protection under all extremes of weather and traffic except for occasional slight water penetration between abutting strip ends.

Example 3

The adhesive composition of Example 2 is similarly applied in 0.04-inch thickness to extruded strips of filled polypropylene containing 30% asbestos and having substantially the thermal expansion of concrete. The strips are 0.04 × 5 × 240 inches. The strips are laid over contraction joints and midpanel cracks in a concrete highway, being adhered to the wirebrushed cleaned surface. The highway is then resurfaced with bituminous concrete or "blacktop". The blacktop coating is protected from moisture normally rising through the cracks in the substrate and which loosens the blacktop layer at such areas. Highway maintenance requirements are greatly reduced.

Example 4

A mixture of 52.2 parts of the process oil as used in Example 2 and 17.5 parts of a process oil having an SSU viscosity at 210° F. of 294, an initial boiling point of 700° F., and an aromatic content of 57.6 percent ("Dutrex 916") is heated to 270° F. To the mixture is added 0.3 part of the antioxidant and 30 parts of the styrene-isoprene block copolymer of Example 1, and 3 parts of polyethylene. The following test values are obtained:

| Adhesion | 35 gm./sq.cm. |
|---|---|
| Tensile | 180 psi |
| Elongation | 1800 % |
| Brittle point | −11° F. |
| Slump | none |

A 0.008 inch coating of the adhesive is transferred to a 0.002 inch polyvinyl fluoride film. The coated film in widths of 3 inches is laid over ¾ inch junction line areas between concrete slabs forming a factory roof. No leakage of water during heavy rains is observed after prolonged exposure, whereas severe leakage occurs through comparable joints sealed with conventional neoprene-based sealing compositions after a single seasonal cycle.

Example 5

A composition containing 67 parts of process oil as in Example 2, and 0.3 part of antioxidant, 30 parts of block copolymer, 3 parts of polyethylene and 6 parts of terpene resin all as defined in Example 1, is further modified by the addition of three parts of heavy mineral oil ("Nujol"). The compounding and coating procedures are as described in the previous Examples. The properties are as follows:

| Adhesion | 79 gm./sq.cm. |
|---|---|
| Tensile | 150 psi |
| Elongation | 1700 % |
| Brittle point | 12° F. |
| Slump | none (trace in 15 min. at 160° F.) |

An 0.008 inch coating is applied to 0.004 inch flexible vinyl resin film which is then employed as a repair covering over cracks and joints in a concrete swimming pool, the painted concrete surface being first wirebrushed and washed. The strip is applied so as to extend at least one-half inch beyond each side of the opening. In those areas where the surface cannot first be dried due to excessive ground water, a priming mixture consisting of one part of the adhesive composition in three parts of a 4:1 mixture of methylethyl ketone and ehtyl alcohol and to which is added five percent of wetting agent is first painted over the surface. Hydroxylated soybean lecithin is a preferred example of a suitable wetting agent. The pool is effectively sealed and the seals remain intact under long continued operation.

The same priming composition is useful in forming an adherent water-proof seal between vinyl resin moldings and glass or metal, as in automotive window construction. The composition may alternatively but less desirably be applied from solution in aromatic or chlorinated aliphatic hydrocarbon solvents or from aqueous suspension. The solvent-free adhesive is also useful in extruded rod or flat strip form as a sealing or caulking strip for windows and other applications.

Example 6

A blend of 65 parts of process oil, 0.25 part of antioxidant, and 10 parts of mineral oil all as identified in Example 5, together with 25 parts of styrene-butadiene block copolymer containing 28% styrene ("Kraton 1101"), is prepared by mixing at 260° F. and in accordance with previously described procedures. The properties of the composition are as follows:

| | |
|---|---|
| Adhesion | 22 gm./sq.cm. |
| Tensile | 4 psi |
| Elongation | 100% |
| Brittle point | −4° F. |
| Slump | ⅛ inch |

Used as a coating on rigid polyvinyl chloride strips to seal concrete highway contraction joints, this composition flows slightly under traffic pressure in hot weather but is otherwise satisfactory. Reduction or elimination of the mineral oil content increases the adhesion and resistance to flow but results in brittleness at low temperatures. Either composition is fully effective when not subjected to extremes of temperature.

What is claimed is as follows:

1. A self-healing tacky adhesive composition consisting essentially of: a major proportion of an aromatic hydrocarbon process oil having a viscosity of at least about 250 (SSU/210° F.), an initial boiling point of at least about 700° F., and an aromatic content (clay-gel method) of at least about 50%; and a minor proportion of a block copolymer having an average molecular weight of at least about 85,000 and having the type formula A-B-A wherein the A components account for about 10-40 percent of the total, each A represents a non-elastomeric vinyl arene polymer block having an average molecular weight of about 5,000 to about 125,000, and B represents an elastomeric conjugated diene polymer block having an average molecular weight of about 75,000 to about 250,000; the amount of said copolymer being between about 35 and about 45 parts per 100 parts of said oil; and said composition having the following properties when tested as described in the specification:

| | | |
|---|---|---|
| adhesion | at least | 10 gm./sq.cm. |
| tensile | at least | 4 psi |
| elongation | at least | 100 % |
| brittle point | not above | 20° F. |
| slump | not more than | 1/8 inch . |

2. An adhesive as defined in claim 1 and including a compatible low molecular weight polyolefin polymer in an amount up to about 30 parts per 100 parts of said copolymer.

3. An adhesive as defined in claim 3 and including a minor amount of a compatible tackifier resin.

4. An adhesive as defined in claim 1 and including a minor amount of non-crystallizing paraffinic mineral oil.

5. A strip material comprising the adhesive composition of claim 1 in the form of a thin coating on a releasable carrier strip.

6. A strip material comprising the adhesive composition of claim 1 in the form of a thin coating permanently bonded to a carrier strip.

7. The strip material of claim 6 wherein said carrier strip is a strip of organic plastic.

8. The strip material of claim 6 wherein said carrier strip is a metal strip.

9. An adhesive as defined in claim 3 wherein said tackifier resin is a polyterpene resin.

\* \* \* \* \*